(12) United States Patent
Hashimoto et al.

(10) Patent No.: US 11,749,254 B2
(45) Date of Patent: Sep. 5, 2023

(54) SOUND SIGNAL PROCESSING METHOD, SOUND SIGNAL PROCESSING DEVICE, AND STORAGE MEDIUM THAT STORES SOUND SIGNAL PROCESSING PROGRAM

(71) Applicant: YAMAHA CORPORATION, Hamamatsu (JP)

(72) Inventors: Dai Hashimoto, Hamamatsu (JP); Takayuki Watanabe, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 29 days.

(21) Appl. No.: 17/329,291

(22) Filed: May 25, 2021

(65) Prior Publication Data
US 2021/0383788 A1 Dec. 9, 2021

(30) Foreign Application Priority Data

Jun. 3, 2020 (JP) ................................ 2020-096757

(51) Int. Cl.
| | | |
|---|---|---|
| *H04S 7/00* | (2006.01) | |
| *G10K 15/12* | (2006.01) | |
| *G10L 25/51* | (2013.01) | |
| *H04R 3/12* | (2006.01) | |
| *H04R 29/00* | (2006.01) | |

(52) U.S. Cl.
CPC .............. *G10K 15/12* (2013.01); *G10L 25/51* (2013.01); *H04R 3/12* (2013.01); *H04R 29/002* (2013.01); *H04R 2430/01* (2013.01); *H04S 7/305* (2013.01)

(58) Field of Classification Search
CPC .... H04R 3/12; H04R 29/002; H04R 2430/01; H04R 29/001; H04R 3/04; H04R 2400/03; H04R 1/403; H04R 1/406; H04R 3/005; H04S 7/301; H04S 7/307; H04S 7/305

USPC ................... 381/56, 83, 93, 66, 63, 61
See application file for complete search history.

(56) References Cited

U.S. PATENT DOCUMENTS

| | | |
|---|---|---|
| 5,642,425 A | 6/1997 | Kawakami |
| 5,757,931 A | 5/1998 | Yamada |
| 10,757,528 B1 * | 8/2020 | Mindlin .................. H04S 3/008 |
| 10,764,703 B2 * | 9/2020 | Giron ...................... G01S 15/42 |
| 10,777,214 B1 * | 9/2020 | Shi ........................ H04R 29/001 |
| 11,037,544 B2 * | 6/2021 | Asada ..................... H04S 7/306 |
| 11,521,591 B2 * | 12/2022 | Leppanen ............... H04S 7/306 |
| 2012/0063608 A1 | 3/2012 | Soulodre |
| 2020/0402496 A1 * | 12/2020 | Tsuchida ................ G10K 15/12 |

FOREIGN PATENT DOCUMENTS

JP          H06284493 A          10/1994

OTHER PUBLICATIONS

Extended European Search Report issued in European Appln. No. 21177095.3 dated Oct. 21, 2021.

\* cited by examiner

*Primary Examiner* — Disler Paul
(74) *Attorney, Agent, or Firm* — ROSSI, KIMMS & McDOWELL LLP

(57) ABSTRACT

The sound signal processing method includes obtaining a sound signal of a sound source, convolving, according to a location of the sound source an impulse response of an early reflection sound with the sound signal to generate an early reflection sound control signal that reproduces an early reflection sound, and convolving an impulse response of a reverberant sound with the sound signal to generate a reverberant sound control signal that reproduces a reverberant sound.

15 Claims, 10 Drawing Sheets

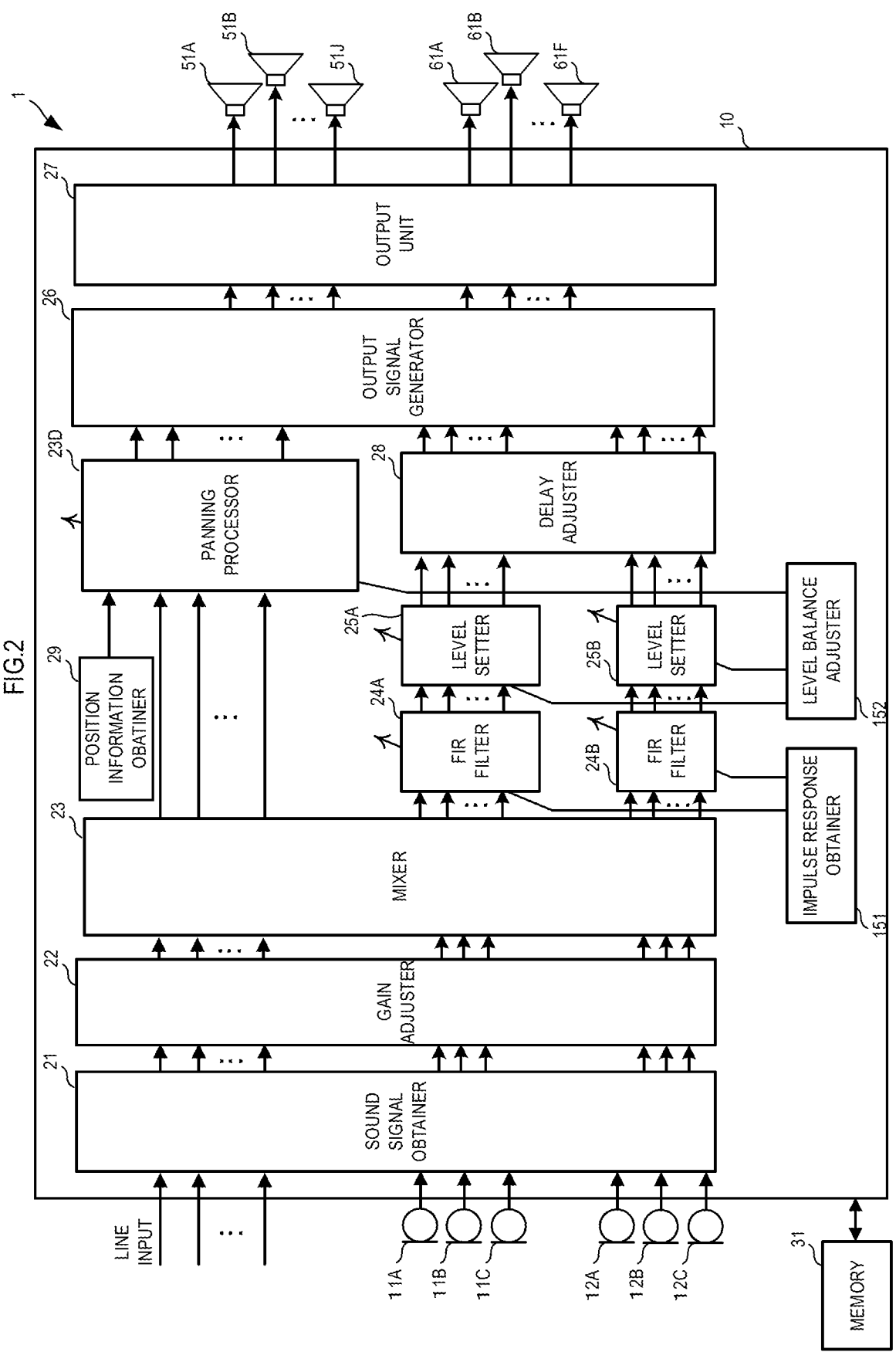

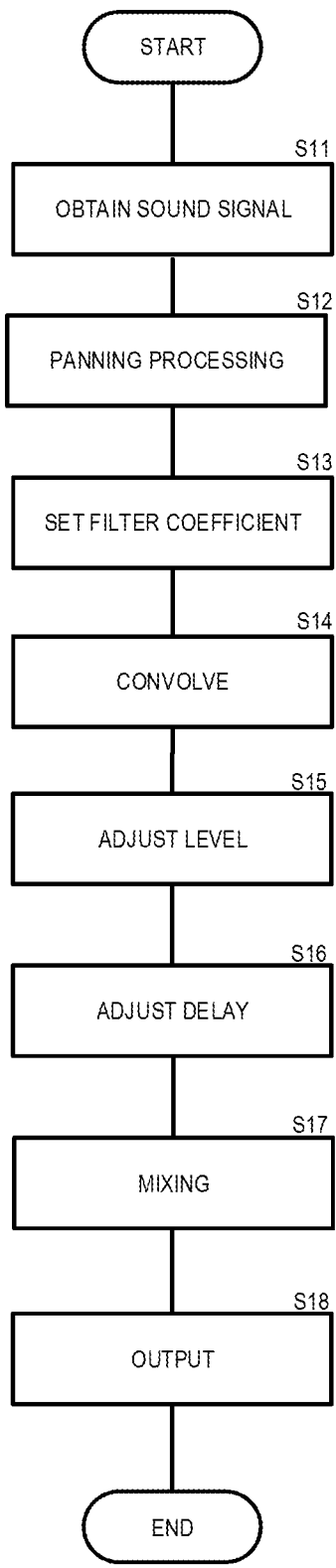

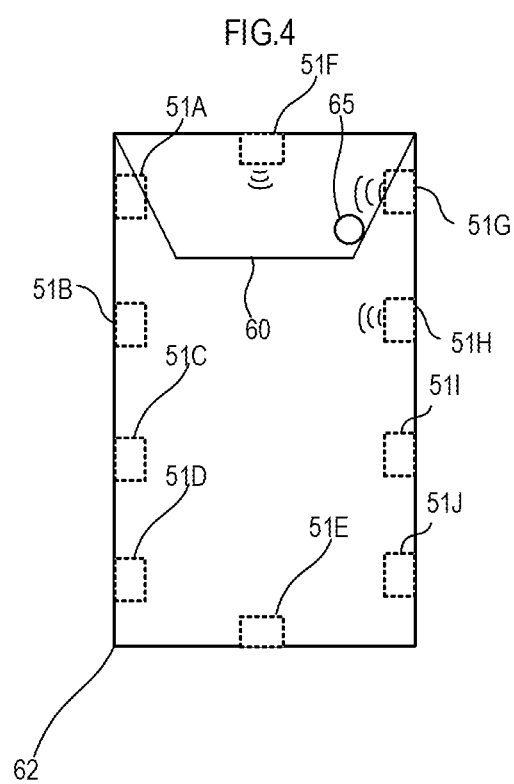

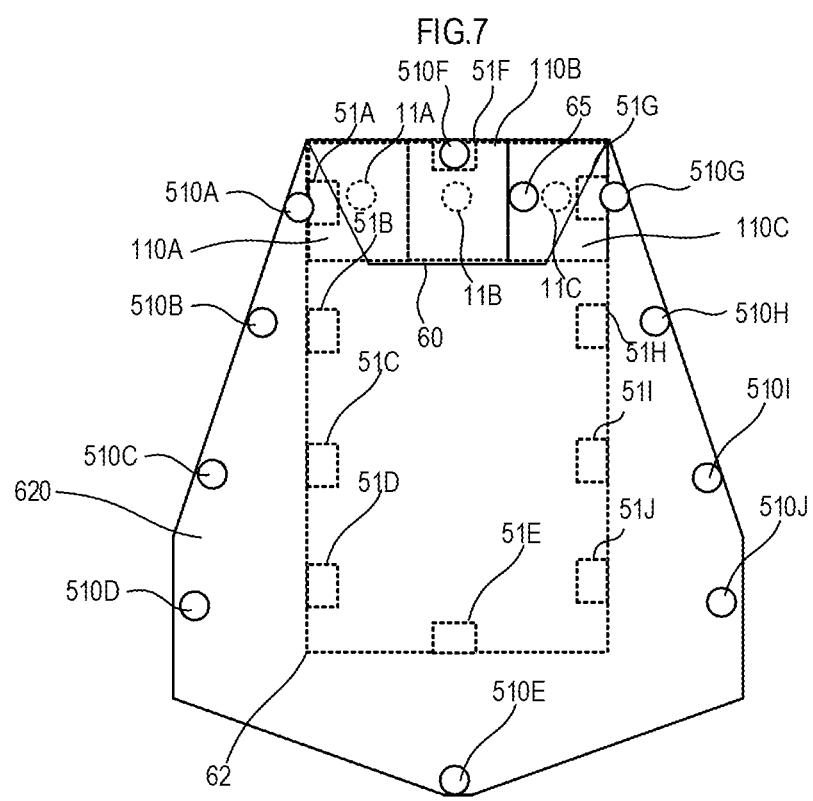

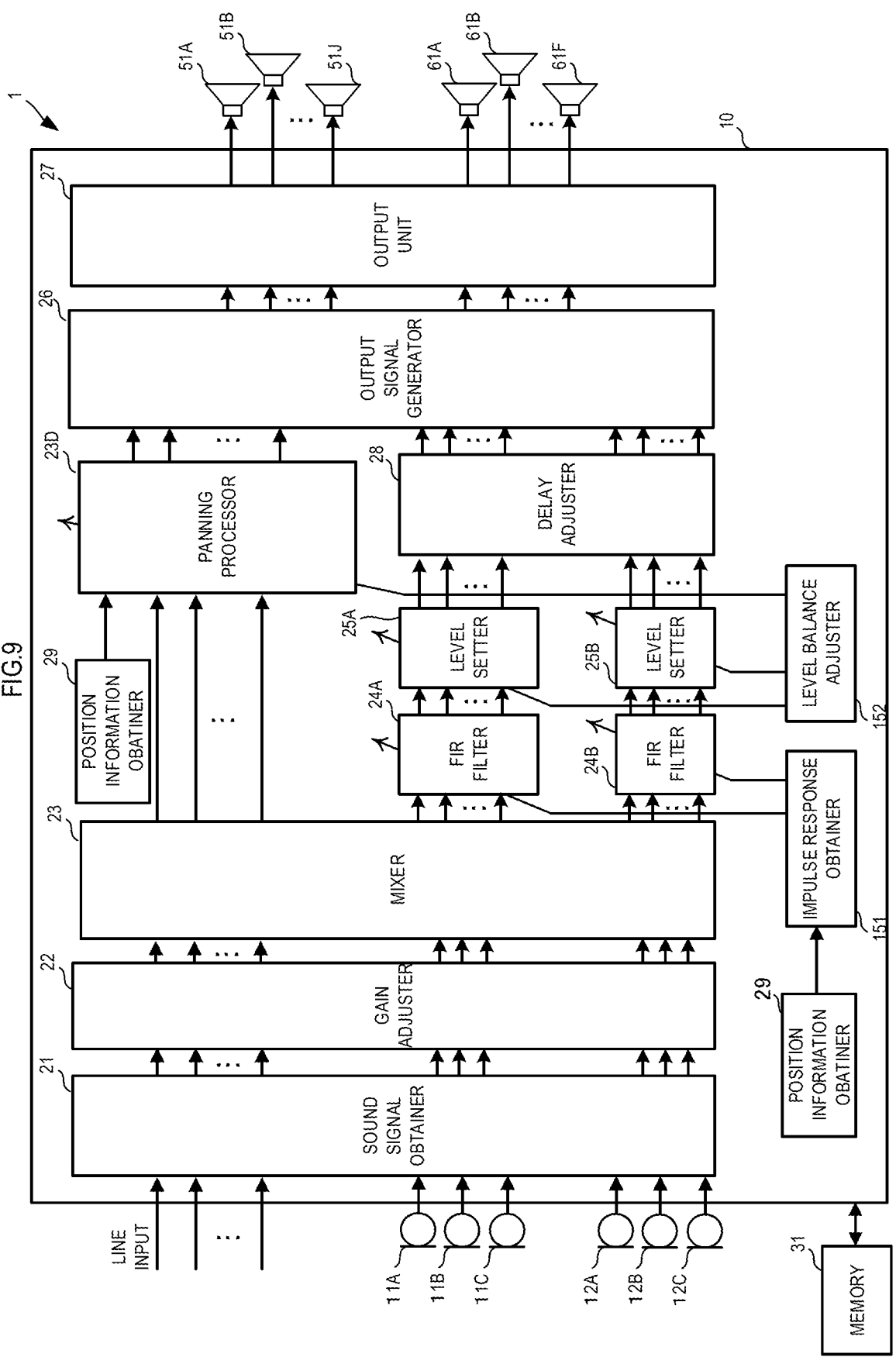

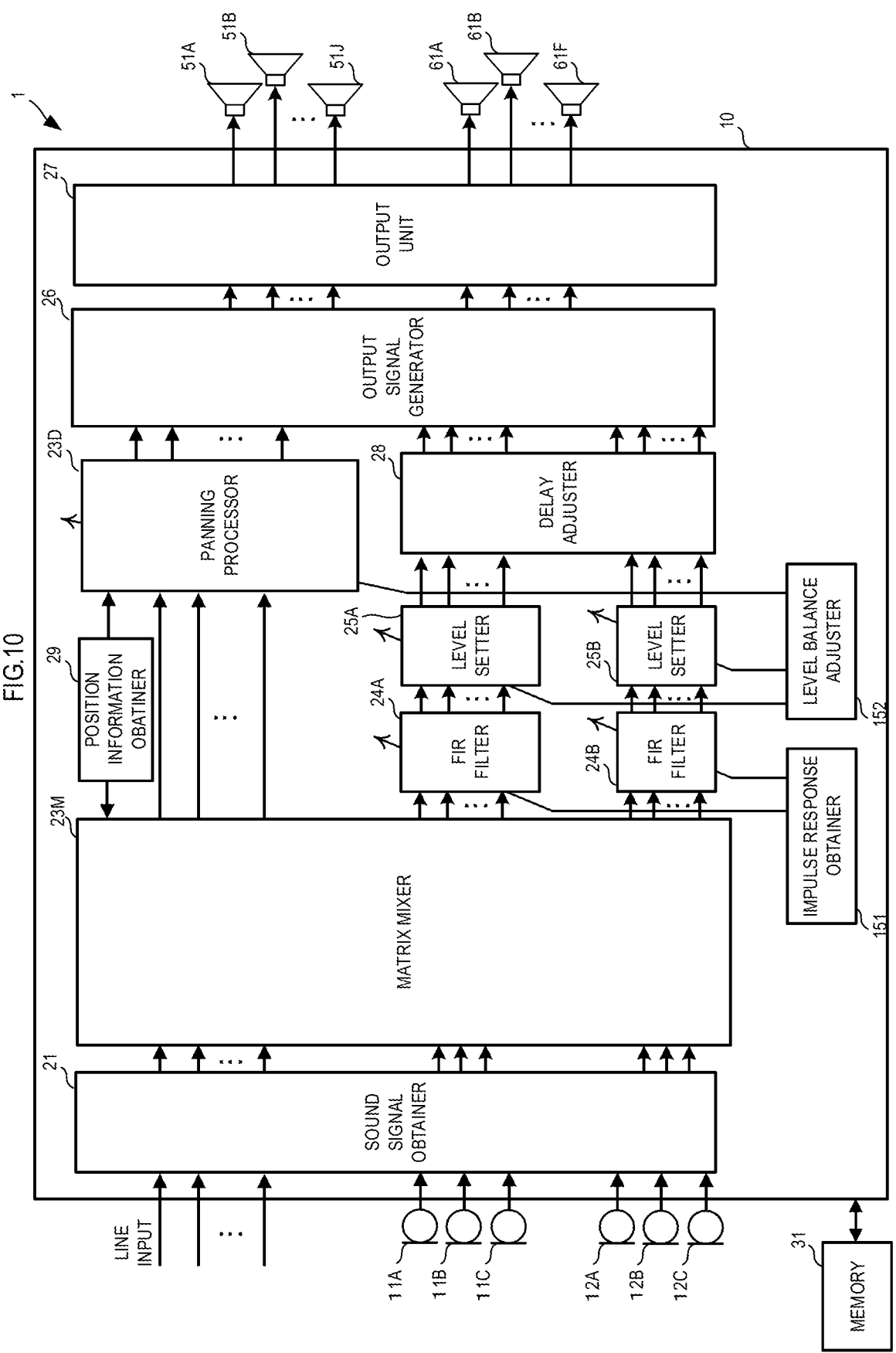

SOUND SIGNAL PROCESSING METHOD, SOUND SIGNAL PROCESSING DEVICE, AND STORAGE MEDIUM THAT STORES SOUND SIGNAL PROCESSING PROGRAM

CROSS REFERENCE TO RELATED APPLICATIONS

This Nonprovisional application claims priority under 35 U.S.C. § 119(a) on Patent Application No. 2020-096757 filed in Japan on Jun. 3, 2020, the entire contents of which are hereby incorporated by reference.

BACKGROUND

Technical Field

One embodiment of the present disclosure relates to a sound signal processing method for processing an obtained sound signal.

Background Information

In facilities such as a concert hall, various genres of music are played and speeches such as a lecture are given. Such facilities are required to have various acoustic characteristics (for example, reverberant characteristics). For example, a performance requires a relatively long reverberant, and a speech requires a relatively short reverberant.

However, in order to physically change the reverberant characteristics in a hall, it is necessary to change the size of an acoustic space by, for example, moving the ceiling, which requires a very large-scale facility.

In view of the above, for example, a sound field control device as shown in JP H06-284493 A performs processing that supports a sound field by generating a reverberant sound by processing the sound obtained by a microphone with a finite impulse response (FIR) filter, and outputting the reverberant sound from a speaker installed in a hall.

SUMMARY

However, the sense of localization is blurred only by adding a reverberant sound. Recently, it has been desired to realize clearer sound image localization and richer space expansion.

In view of the above, an object of one embodiment of the present disclosure is to provide a sound signal processing method for controlling a richer acoustic space.

The sound signal processing method includes obtaining a sound signal of a sound source, convolving, according to a location of the sound source an impulse response of an early reflection sound according to a location of the sound source with the sound signal to generate an early reflection sound control signal that reproduces an early reflection sound, and convolving an impulse response of a reverberant sound with the sound signal to generate a reverberant sound control signal that reproduces a reverberant sound.

The sound signal processing method can realize clearer sound image localization and richer space expansion.

BRIEF DESCRIPTION OF THE DRAWINGS

FIG. 2 is a block diagram illustrating a configuration of a sound field support system of the first embodiment;

FIG. 3 is a flowchart showing operation of a sound signal processing device;

FIG. 4 is a plan view schematically illustrating a relationship between a room 62, speakers 51A to 51J, and a sound source 65;

FIG. 7 is a plan view schematically illustrating a relationship between a space 620 and the room 62;

FIG. 9 is a block diagram illustrating a configuration of a sound signal processor 10 according to a first variation; and FIG. 10 is a block diagram illustrating a configuration of the sound signal processor 10 according to a second variation.

DETAILED DESCRIPTION

Figure 1:
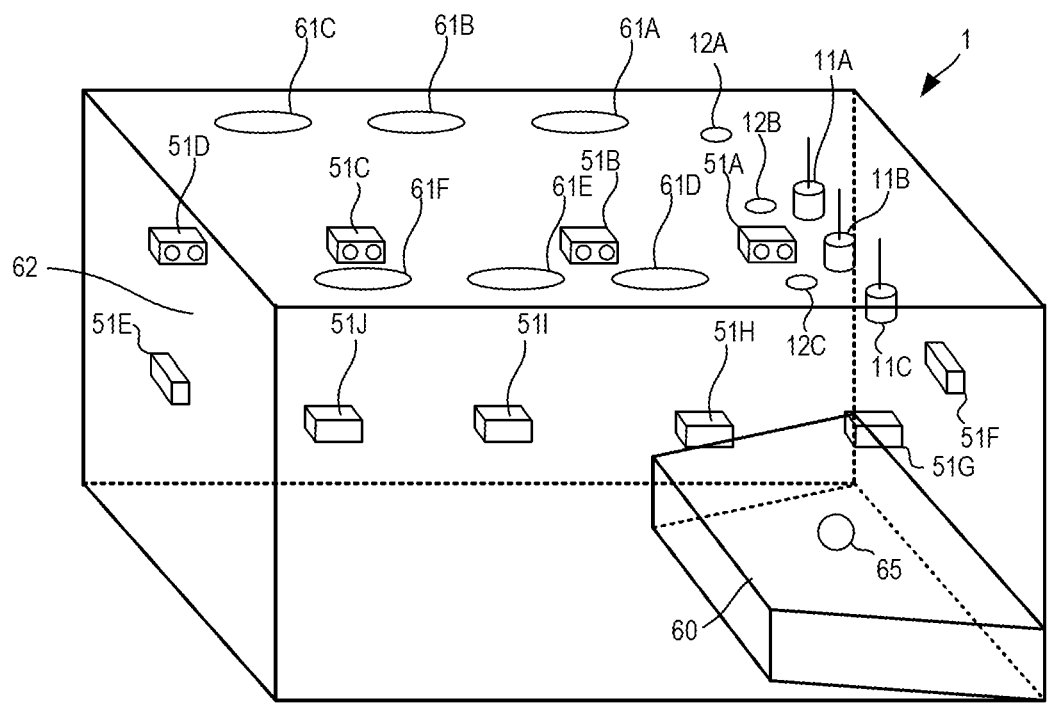
FIG. 1 is a transparent perspective view schematically illustrating a space of a first embodiment.

FIG. 1 is a transparent perspective view schematically illustrating a room 62 constituting a space. FIG. 2 is a block diagram illustrating a configuration of a sound field support system 1.

The room 62 constitutes a space having a substantially rectangular parallelepiped shape. A sound source 65 exists on a stage 60 at the front of the room 62. The back of the room 62 corresponds to audience seats where listeners sit. The sound source 65 is, for example, a voice, a singing sound, an acoustic musical instrument, an electric musical instrument, an electronic musical instrument, or the like.

The shape of the room 62, the arrangement of sound sources, and the like are not limited to the example shown in FIG. 1. A sound signal processing method and a sound signal processing device of the present disclosure can provide a desired sound field in a space of any shape, and realize clearer sound image localization and richer space expansion than before.

The sound field support system 1 includes, in the room 62, a directional microphone 11A, a directional microphone 11B, a directional microphone 11C, an omnidirectional microphone 12A, an omnidirectional microphone 12B, an omnidirectional microphone 12C, speakers 51A to 51J, and speakers 61A to 61F.

The speakers 51A to 51J are set on a wall surface. The speakers 51A to 51J are speakers with relatively high directivity, and mainly output sound toward audience seats. The speakers 51A to 51J output an early reflection sound control signal that reproduces an early reflection sound. Further, the speakers 51A to 51J output a direct sound control signal that reproduces a direct sound of the sound source.

The speakers 61A to 61F are installed on the ceiling. The speakers 61A to 61F are speakers with relatively low directivity, and output sound to the entire room 62. The speakers 61A to 61F output a reverberant sound control signal that reproduces a reverberant sound. Further, the speakers 61A to 61F output a direct sound control signal that reproduces a direct sound of the sound source. The number of speakers is not limited to the number shown in FIG. 1.

The directional microphone 11A, the directional microphone 11B, and the directional microphone 11C mainly collect the sound of the sound source 65 on the stage. As shown in FIG. 1, the directional microphone 11A collects a sound in an area on the left side of the stage 60 when viewed from the audience seats. The directional microphone 11B collects a sound in the central area of the stage 60 when viewed from the audience seats. The directional microphone 11C collects a sound in an area on the right side of the stage 60 when viewed from the audience seats.

However, the sound of the sound source 65 may be receive by line input. In the line input, the sound output from a sound source of an instrument or the like is not collected with a microphone and receive, but a sound signal is received from an audio cable or the like connected to the sound source. Alternatively, as the sound of the sound source 65, the voice or singing sound of a performer such as a speaker or a singer may be received from a hand microphone, a stand microphone, a pin microphone, or the like. The sound of the sound source is preferably collected at a high SN ratio.

The omnidirectional microphone 12A, the omnidirectional microphone 12B, and the omnidirectional microphone 12C are installed on the ceiling. The omnidirectional microphone 12A, the omnidirectional microphone 12B, and the omnidirectional microphone 12C collect the entire sound in the room 62, including the direct sound of the sound source 65 and the reflection sound in the room 62. The number of the directional microphones and the omnidirectional microphones shown in FIG. 1 is three each. However, the number of microphones is not limited to that in the example shown in FIG. 1. Further, the installation positions of the microphone and the speaker are not limited to those in the example shown in FIG. 1.

In FIG. 2, the sound field support system 1 includes a sound signal processor 10 and a memory 31 in addition to the configuration shown in FIG. 1. The sound signal processor 10 is mainly composed of a CPU and a digital signal processor (DSP). The sound signal processor 10 functionally includes a sound signal obtainer 21, a gain adjuster 22, a mixer 23, a panning processor 23D, a finite impulse response (FIR) filter 24A, an FIR filter 24B, a level setter 25A, a level setter 25B, an output signal generator 26, an output unit 27, a delay adjuster 28, a position information obtainer 29, an impulse response obtainer 151, and a level balance adjuster 152. The sound signal processor 10 is an example of the sound signal processing device of the present disclosure.

The CPU constituting the sound signal processor 10 reads an operation program stored in the memory 31 and controls each configuration. The CPU functionally constitutes the impulse response obtainer 151 and the level balance adjuster 152 by the operation program. The operation program does not need to be stored in the memory 31. The CPU may download the operation program from, for example, a server (not shown) each time.

FIG. 3 is a flowchart showing the operation of the sound signal processor 10. First, the sound signal obtainer 21 obtains a sound signal (S11). The sound signal obtainer 21 obtains a sound signal from the directional microphone 11A, the directional microphone 11B, the directional microphone 11C, the omnidirectional microphone 12A, the omnidirectional microphone 12B, and the omnidirectional microphone 12C. Alternatively, the sound signal obtainer 21 may receive a sound signal from an electric musical instrument, an electronic musical instrument, or the like by line input. Further, the sound signal obtainer 21 may receive a sound signal from a microphone installed directly on a musical instrument or the performer such as a pin microphone. When obtaining an analog signal, the sound signal obtainer 21 converts the analog signal into a digital signal and outputs the signal.

The gain adjuster 22 adjusts a gain of the sound signal obtained by the sound signal obtainer 21. The gain adjuster 22 sets, for example, a gain of the directional microphone at a position close to the sound source 65 to be high. The gain adjuster 22 is not an essential configuration in the present disclosure.

The mixer 23 mixes the sound signal whose gain is adjusted by the gain adjuster 22. Further, the mixer 23 distributes the mixed sound signal to a plurality of signal processing systems. The mixer 23 outputs the distributed sound signal to the panning processor 23D, the FIR filter 24A, and the FIR filter 24B.

For example, the mixer 23 distributes the sound signals obtained from the directional microphone 11A, the directional microphone 11B, and the directional microphone 11C to ten signal processing systems according to the speakers 51A to 51J. Alternatively, the mixer 23 may distribute line-inputted sound signals to ten signal processing systems according to the speakers 51A to 51J.

Further, the mixer 23 distributes the sound signals obtained from the omnidirectional microphone 12A, the omnidirectional microphone 12B, and the omnidirectional microphone 12C to six signal processing systems according to the speakers 61A to 61F.

The mixer 23 outputs the sound signals mixed in the ten signal processing systems to the FIR filter 24A. Further, the mixer 23 outputs the sound signals mixed in six signal processing systems to the FIR filter 24B.

Hereinafter, the six signal processing systems that output a sound signal to the FIR filter 24B will be referred to as a first system or a reverberant sound system, and the ten signal processing systems that output a sound signal to the FIR filter 24A will be referred to as a second system or an early reflection sound system. Further, ten signal processing systems that output a sound signal to the panning processor 23D will be referred to as a third system or a direct sound system. The FIR filter 24A corresponds to an early reflection sound control signal generator, and the FIR filter 24B corresponds to a reverberant sound control signal generator. The panning processor 23D corresponds to a direct sound control signal generator.

The mode of distribution is not limited to that in the above example. For example, sound signals obtained from the omnidirectional microphone 12A, the omnidirectional microphone 12B, and the omnidirectional microphone 12C may be distributed to the direct sound system or the early reflection sound system. Further, a line-inputted sound signal may be distributed to the reverberant sound system. Further, a line-inputted sound signal and sound signals obtained from the omnidirectional microphone 12A, the omnidirectional microphone 12B, and the omnidirectional microphone 12C may be mixed and distributed to the direct sound system or the early reflection sound system.

The mixer 23 may have a function of electronic microphone rotator (EMR). The EMR is a method of flattening the frequency characteristics of a feedback loop by changing a transfer function between a fixed microphone and a speaker over time. The EMR is a function that switches a connection relationship between a microphone and a signal processing system from moment to moment. The mixer 23 outputs a sound signal obtained from the directional microphone 11A, the directional microphone 11B, and the directional microphone 11C to the panning processor 23D and the FIR filter 24A by switching an output destination. Alternatively, the mixer 23 outputs the sound signal obtained from the omnidirectional microphone 12A, the omnidirectional microphone 12B, and the omnidirectional microphone 12C to the FIR filter 24B by switching an output destination. In this manner, the mixer 23 can flatten the frequency characteristics of an acoustic feedback system from a speaker to a microphone in the room 62. Further, the mixer 23 can ensure stability against howling.

Next, the panning processor 23D controls the volume of each sound signal of the direct sound system according to the position of the sound source 65 (S12). In this manner, the panning processor 23D generates a direct sound control signal.

FIG. 4 is a plan view schematically illustrating a relationship between the room 62, the speakers 51A to 51J, and the sound source 65. In the example of FIG. 4, the sound source 65 is located on the right side of the stage when viewed from the audience seats. The panning processor 23D controls the volume of each sound signal of the direct sound system so that the sound image is localized at the position of the sound source 65.

The panning processor 23D obtains the position information of the sound source 65 from the position information obtainer 29. The position information is information indicating two-dimensional or three-dimensional coordinates with respect to a certain position of the room 62. The position information of the sound source 65 can be obtained by a beacon and a tag that transmit and receive a radio wave of, for example, Bluetooth (registered trademark). In the room 62, at least three beacons are installed in advance. The sound source 65 includes a tag. That is, a tag is attached to a performer or an instrument. Each beacon transmits and receives a radio waves to and from the tag. Each beacon measures the distance to the tag based on the time difference between transmitting and receiving of radio waves. If the position information obtainer 29 obtains the position information of the beacon in advance, the position of the tag can be uniquely obtained by measurement of the distances from at least three beacons to the tag.

The position information obtainer 29 obtains the position information of the sound source 65 by obtaining the position information of the tag measured in the above manner. Further, the position information obtainer 29 obtains the position information of each of the speakers 51A to 51J and the speakers 61A to 61F in advance.

The panning processor 23D controls the volume of each sound signal output to the speakers 51A to 51J and the speakers 61A to 61F so that the sound image is localized at the position of the sound source 65 based on the obtained position information and the position information of the speakers 51A to 51J and the speakers 61A to 61F, so as to generate the direct sound control signal.

The panning processor 23D controls the volume according to the distance between the sound source 65 and each of the speakers, the speakers 51A to 51J and the speakers 61A to 61F. For example, the panning processor 23D increases the volume of the sound signal output to the speaker near the position of the sound source 65, and decreases the volume of the sound signal output to the speaker far from the position of the sound source 65. In this manner, the panning processor 23D can localize the sound image of the sound source 65 at a predetermined position. For example, in the example of FIG. 4, the panning processor 23D increases the volume of the sound signal output to the three speakers 51F, 51G, and 51H close to the sound source 65, and decreases the volume of the other speakers. In this manner, the sound image of the sound source 65 is localized on the right side of the stage when viewed from the audience seats.

If the sound source 65 moves to the left side of the stage, the panning processor 23D changes the volume of each sound signal output to the speakers 51A to 51J and the speakers 61A to 61F based on the position information of the moved sound source 65. For example, the panning processor 23D increases the volume of the sound signal output to the speakers 51A, 51B, and 51F, and decreases the volume of the other speakers. In this manner, the sound image of the sound source 65 is localized on the left side of the stage when viewed from the audience seats.

As described above, the sound signal processor 10 realizes a distribution processor by the mixer 23 and the panning processor 23D.

Next, the impulse response obtainer 151 sets filter coefficients of the FIR filter 24A and the FIR filter 24B (S13).

Figure 5A:
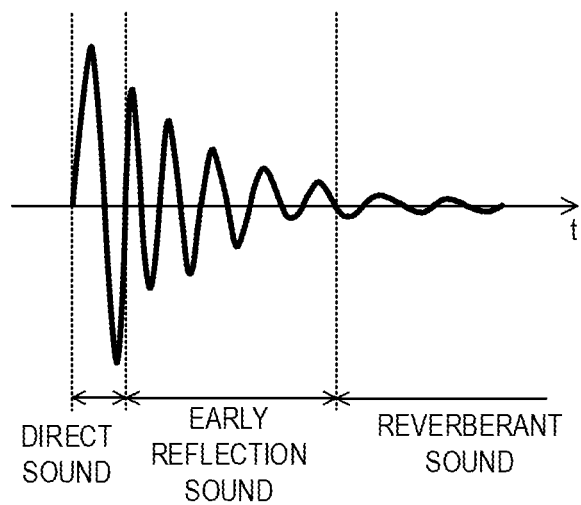
FIG. 5A is a schematic diagram illustrating an example of classification of sound types in a time waveform of an impulse response used for a filter coefficient.
Figure 5B:
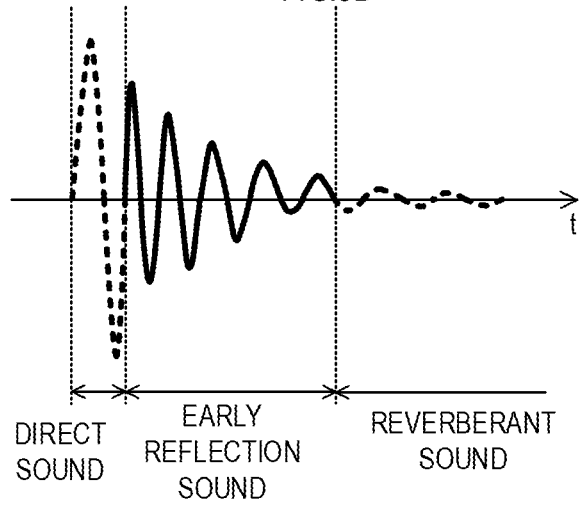
FIG. 5B is a schematic diagram illustrating a time waveform of a filter coefficient set to an FIR filter 24A.
Figure 6A:
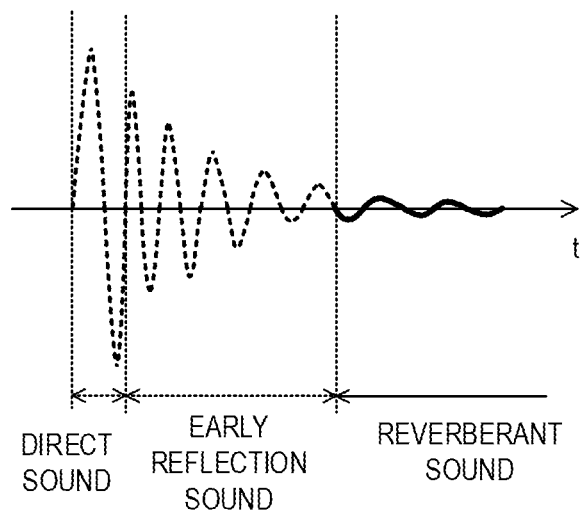
FIG. 6A is a schematic diagram illustrating an impulse response set to an FIR filter 24B.
Figure 6B:
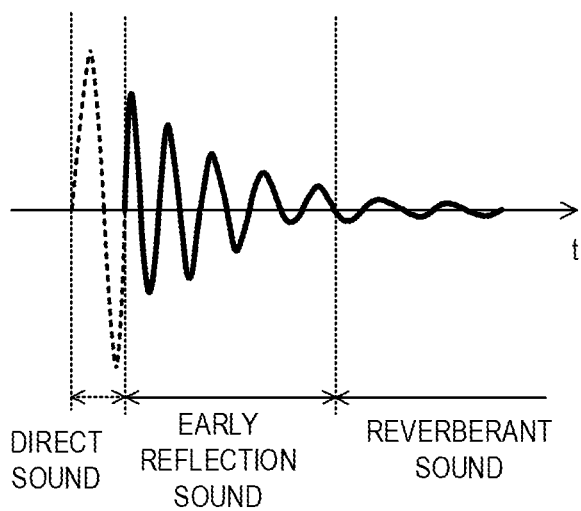
FIG. 6B is a schematic diagram illustrating a time waveform of a filter coefficient set to the FIR filter 24B.

Here, impulse response data set to the filter coefficient will be described. FIG. 5A is a schematic diagram illustrating an example of classification of sound types in a time waveform of an impulse response used for the filter coefficient, and FIG. 5B is a schematic diagram illustrating a time waveform of the filter coefficient set to the FIR filter 24A. FIGS. 6A and 6B are schematic diagrams illustrating time waveforms of the filter coefficient set in the FIR filter 24B.

As shown in FIG. 5A, an impulse response can be classified into a direct sound, an early reflection sound, and a reverberant sound arranged on the time axis. Then, as shown in FIG. 5B, the filter coefficient set to the FIR filter 24A is set by the portion of the early reflection sound excluding the direct sound and the reverberant sound in the impulse response. As shown in FIG. 6A, the filter coefficient set to the FIR filter 24B is set by the reverberant sound excluding the direct sound and the early reflection sound in the impulse response. As shown in FIG. 6B, the FIR filter 24B may be set by the early reflection sound and the reverberant sound excluding the direct sound in the impulse response.

Data of the impulse response is stored in the memory 31. The impulse response obtainer 151 obtains data of an impulse response from the memory 31. However, the data of an impulse response does not need to be stored in the memory 31. The impulse response obtainer 151 may download the data of an impulse response from, for example, a server (not shown) each time.

The impulse response obtainer 151 may obtain the data of an impulse response in which only the early reflection sound is cut out in advance and set the data to the FIR filter 24A. Alternatively, the impulse response obtainer 151 may obtain the data of an impulse response including the direct sound, the early reflection sound, and the reverberant sound, cut out only the early reflection sound, and set the data to the FIR filter 24A. Similarly, when only the reverberant sound is used, the impulse response obtainer 151 may obtain the data of an impulse response obtained by cutting out only the reverberant sound in advance and set the data to the FIR filter 24B. Alternatively, the impulse response obtainer 151 may obtain the data of an impulse response including the direct sound, the early reflection sound, and the reverberant sound, cut out only the reverberant sound, and set the data to the FIR filter 24B.

The FIR filter 24A generates an early reflection sound control signal that reproduces an early reflection sound in a predetermined space by convolving the data of an impulse response of an early reflection sound with an input sound signal (S14). Further, the FIR filter 24B generates a reverberant sound control signal that reproduces a reverberant sound in a predetermined space by convolving the data of an impulse response of a reverberant sound with an input sound signal (S14).

FIG. 7 is a plan view schematically illustrating a relationship between a space 620 and the room 62. As shown in FIG. 7, the data of an impulse response is measured in advance in the predetermined space 620 such as a concert hall or a church where the sound field is to be reproduced. For example, the data of an impulse response is measured in a manner that a test sound (pulse sound) is generated at a predetermined position on the stage and the test sound is collected with a plurality of microphones installed in the space 620.

In the present embodiment, for the data of an impulse response, an impulse response when the test sound is emitted in an area 110A on the left side of the stage 60, an impulse response when the test sound is emitted in an area 110B on the center of the stage 60, and an impulse response when the test sound is emitted in an area 110C on the right side of the stage 60 are measured.

The data of an impulse response of an early reflection sound is measured using a plurality of directional microphones 510A to 510J installed near a wall surface. When a directional microphone installed near a wall surface is used, the data of an impulse response is measured with a separate directional microphone for each signal processing system. For example, as shown in FIG. 7, for a signal processing system corresponding to the speaker 51J installed on the right rear side from the stage 60, the data of an impulse response is measured with a directional microphone 510J installed near a wall surface on the right rear side from the stage 60.

The data of an impulse response is measured with ten systems of the directional microphones 510A to 510J for each of the three sound source systems in the area 110A, the area 110B, and the area 110C. That is, as for the data of an impulse response, three sets of ten impulse responses measured with the directional microphones 510A to 510J are measured according to the positions of the sound sources. Hereinafter, the ten impulse responses measured for the sound source in the area 110A will be referred to as first impulse responses, the ten impulse responses measured for the sound source in the area 110B will be referred to as second impulse responses, and the ten impulse responses measured for the sound source in the area 110C will be referred to as third impulse responses. The three systems of the area 110A, the area 110B, and the area 110C correspond to the directional microphone 11A, the directional microphone 11B, and the directional microphone 11C in the room 62, respectively, and the ten systems of the directional microphones 510A to 510J correspond to the speakers 51A to 51J.

Figure 8:
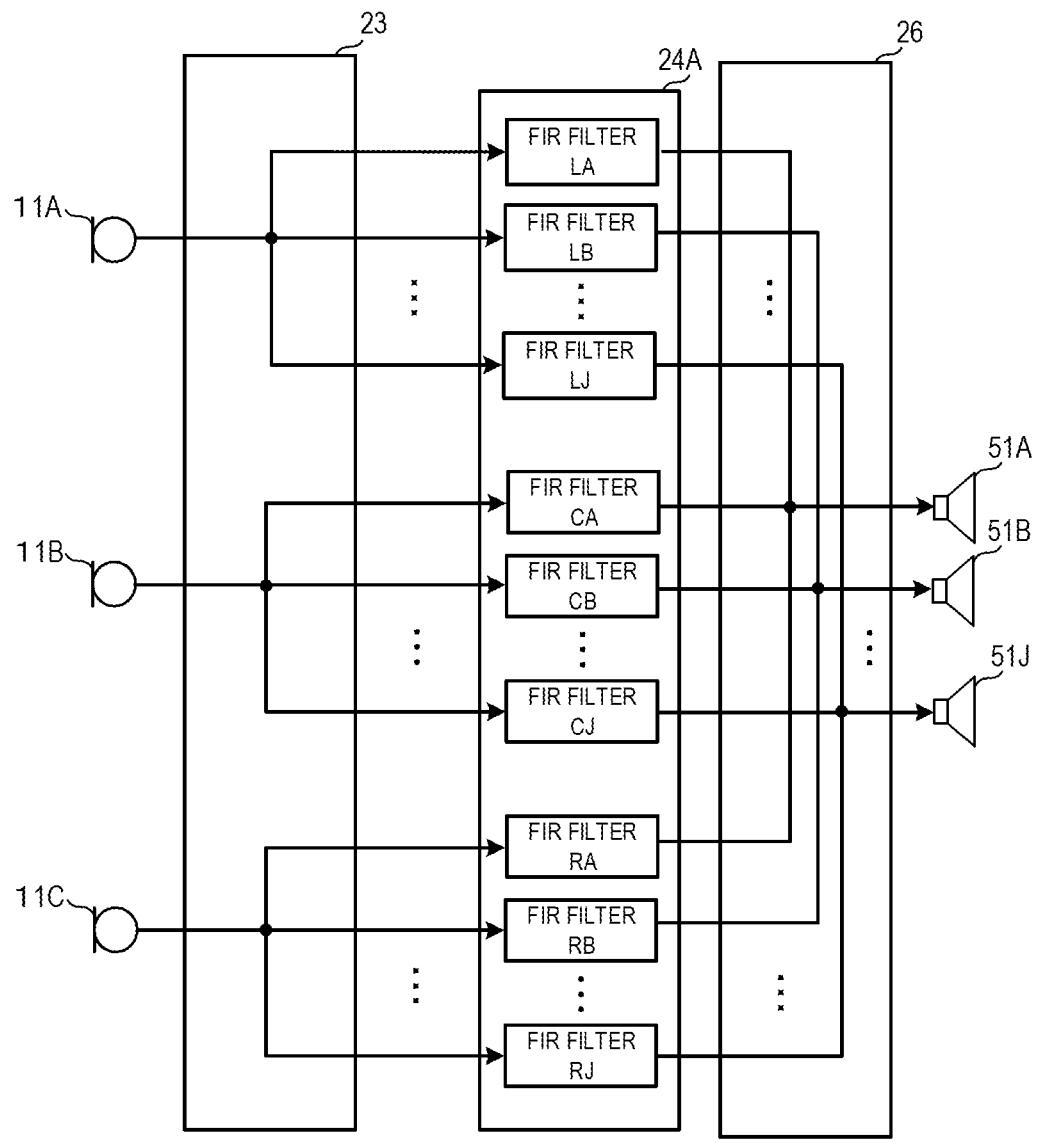
FIG. 8 is a block diagram illustrating a functional configuration of the FIR filter 24A.

FIG. 8 is a block diagram illustrating a functional configuration of the FIR filter 24A; As shown in FIG. 8, the mixer 23 distributes sound signals obtained by the directional microphone 11A, the directional microphone 11B, and the directional microphone 11C to sound signals of ten systems. The FIR filter 24A convolves the first impulse response, the second impulse response, and the third impulse response with the sound signal distributed from the mixer 23.

When the sound source 65 is located in the area 110A, the FIR filter 24A performs filtering processing with ten FIR filters LA to LJ corresponding to the first impulse responses. Similarly, when the sound source 65 is located in the area 110B, the FIR filter 24A performs filtering processing with ten FIR filters CA to CJ corresponding to the second impulse responses. When the sound source 65 is located in the area 110C, the FIR filter 24A performs filtering processing with ten FIR filters RA to RJ corresponding to the third impulse responses.

In this manner, the FIR filter 24A thus generates three-by-ten systems of early reflection sound control signals. The FIR filter 24B generates three-by-six systems of reverberant sound control signals.

The reverberant sound is a reflection sound in which the direction of arrival of the sound is uncertain. Therefore, the data of an impulse response of a reverberant sound has a smaller change due to a change in the position of a sound source than that of an early reflection sound. Therefore, the data of an impulse response of a reverberant sound may be measured by using another omnidirectional microphone instead of the above-mentioned directional microphones 510A to 510J. Further, the FIR filter 24B may convolve the data of the same impulse response with a sound signal obtained by mixing sound signals obtained by the omnidirectional microphone 12A, the omnidirectional microphone 12B, and the omnidirectional microphone 12C to generate a reverberant sound control signal.

The level setter 25A adjusts the level of the early reflection sound control signal. The level setter 25B adjusts the level of the reverberant sound control signal. The level balance adjuster 152 sets a level adjustment amount of the panning processor 23D, the level setter 25A, and the level setter 25B (S15). The level balance adjuster 152 refers to a level of each of the direct sound control signal, the early reflection sound control signal, and the reverberant sound control signal, and adjusts the level balance of these signals. For example, the level balance adjuster 152 adjusts the level balance between the last level in time of the direct sound control signal and the first component in time of the early reflection sound control signal. Further, the level balance adjuster 152 adjusts the balance between the level of the last component in time of the early reflection sound control signal and the level of the first component in time of the reverberant sound control signal. Alternatively, the level balance adjuster 152 may adjust the balance between the power of a plurality of components of the latter half in time of the early reflection sound control signal and the power of a component of the first half in time of the reverberant sound control signal. In this manner, the level balance adjuster 152 can individually control the sounds of the direct sound control signal, the early reflection sound control signal, and the reverberant sound control signal, and control the sounds to be in an appropriate balance according to the space to which the sounds are applied.

The delay adjuster 28 adjusts delay time according to the distance between an optional microphone and a plurality of speakers (S16). For example, for a plurality of speakers, the delay adjuster 28 sets the delay time to be smaller in ascending order of distances between the directional microphone 11B and the speakers. Alternatively, the delay adjuster 28 adjusts the delay time from the positions of the sound source and the microphone for which to measure the impulse response in the space 620 that reproduces the sound field. For example, in the FIR filter 24A, when the impulse response data measured at the directional microphone 510J installed in the space 620 is convolved with the speaker 51J, the delay time corresponding to the distance between the directional microphone 510J and the sound source 65 in the space 620 is set to the delay time of the speaker 51J in the delay adjuster 28. In this manner, the early reflection sound control signal and the reverberant sound control signal reach the listener later than the direct sound, so that clear sound image localization and rich space expansion are realized.

It is preferable that the sound signal processor 10 do not perform delay adjustment on the direct sound control signal. If the position of the sound source 65 changes significantly in a short period of time when the sound image localization is controlled by the delay adjustment, phase interference occurs between the sounds output from a plurality of speakers. By not performing the delay adjustment on the direct sound control signal, the sound signal processor 10 can maintain the timbre of the sound source 65 without causing phase interference even if the position of the sound source 65 changes significantly in a short time. The output signal generator 26 mixes the direct sound control signal, the early reflection sound control signal, and the reverberant sound control signal to generate an output signal (S17). The output signal generator 26 may perform gain adjustment of each signal, adjustment of the frequency characteristics, and the like at the time of mixing.

The output unit 27 converts an output signal output from the output signal generator 26 into an analog signal. Further, the output unit 27 amplifies the analog signal. The output unit 27 outputs the amplified analog signal to a corresponding speaker (S18).

With the above configuration, the sound signal processor 10 obtains a sound signal and convolves an impulse response of an early reflection sound according to the position of a sound source with the obtained sound signal to generate the early reflection sound control signal. Further, the sound signal processor 10 generates a reverberant sound control signal by convolving an impulse response of a reverberant sound according to the location of a sound source with the obtained sound signal.

For example, in the example of FIG. 7, the sound source 65 exists in the area 110C of the stage 60. In this case, the early reflection sound control signal is generated by the FIR filters RA to RJ shown in FIG. 8. If the sound source 65 moves to the area 110B of the stage 60, the early reflection sound control signal is generated by the FIR filters CA to CJ shown in FIG. 8. Further, if the sound source 65 moves to the area 110A of the stage 60, the early reflection sound control signal is generated by the FIR filters LA to LJ shown in FIG. 8. As described above, the sound signal processor 10 can realize more natural sense of localization of a sound image and space expansion than before by changing the filter coefficient of the FIR filter according to the position of a sound source.

However, the early reflection sound control signal and the reverberant sound control signal may be generated from sound signals obtained from the directional microphones 11A to 11C and the omnidirectional microphones 12A to 12C. For example, in the example of FIG. 7, the sound source 65 exists on the right side of the stage 60. In this case, the level of a sound signal obtained by the directional microphone 11C becomes high. Therefore, the level of the early reflection sound control signal generated by the FIR filters RA to RJ shown in FIG. 8 is dominant among the early reflection sound control signals. If the sound source 65 moves to the center of the stage 60, the level of a sound signal obtained by the directional microphone 11B becomes high. Therefore, the level of the early reflection sound control signal generated by the FIR filters CA to CJ shown in FIG. 8 is dominant among the early reflection sound control signals. If the sound source 65 moves to the left side of the stage 60, the level of a sound signal obtained by the directional microphone 11C becomes high. Therefore, the level of the early reflection sound control signal generated by the FIR filters LA to LJ shown in FIG. 8 is dominant among the early reflection sound control signals. That is, the sound signal processor 10 can change the filter coefficient of the FIR filter according to the position of a sound source without detecting the position of the sound source. As described above, the sound signal processor 10 can reproduce more natural sense of localization and reverberant of an early reflection sound than before by changing the filter coefficient of the FIR filter according to the position of a sound source.

FIG. 9 is a block diagram illustrating a configuration of a sound signal processor 10 according to a first variation. The impulse response obtainer 151 of FIG. 9 obtains the position information of the sound source 65 from the position information obtainer 29. The impulse response obtainer 151 obtains a filter coefficient set to the FIR filter 24A and the FIR filter 24B from the data of an impulse response based on the obtained position information. As shown in FIG. 7, a plurality of pieces of data of an impulse response are obtained according to the position of a sound source. In the example of FIG. 7, the data of an impulse response has the first impulse response, the second impulse response, and the third impulse response. Each of the impulse responses is associated with the position information of each sound source.

The impulse response obtainer 151 obtains the data of an impulse response corresponding to the position information of the obtained sound source. For example, when the position of the sound source 65 is on the left side of the stage 60, the impulse response obtainer 151 reads the data of the first impulse response from the memory 31 and sets the data to the FIR filter 24A. In this case, the FIR filter 24A becomes a first filter. When the position of the sound source 65 is on the center of the stage 60, the impulse response obtainer 151 reads the data of the second impulse response from the memory 31 and sets the data to the FIR filter 24A. In this case, the FIR filter 24A becomes a second filter. When the position of the sound source 65 is on the right side of the stage 60, the impulse response obtainer 151 reads the data of the third impulse response from the memory 31 and sets the data to the FIR filter 24A. In this case, the FIR filter 24A becomes a third filter.

As described above, in the example of FIG. 9, the sound signal processor 10 changes the filter coefficient set to the FIR filter 24A based on the position information of a sound source.

The number of pieces of the data of an impulse response is not limited to three as in the example of FIG. 7. For example, the impulse response obtainer 151 can obtain the data of an impulse response for each of a larger number of positions to realize more natural sense of localization of the sound image and space expansion.

FIG. 10 is a block diagram illustrating a configuration of the sound signal processor 10 according to a second variation. The sound signal processor 10 of FIG. 10 includes a matrix mixer 23M instead of the gain adjuster 22 and the mixer 23.

The matrix mixer 23M mixes sound signals obtained by the directional microphone 11A, the directional microphone 11B, the directional microphone 11C, the omnidirectional microphone 12A, the omnidirectional microphone 12B, and the omnidirectional microphone 12C at a predetermined level, and distributes them to the FIR filter 24A and the FIR filter 24B.

The matrix mixer 23M controls the level of the sound signal distributed to the FIR filter 24A and the FIR filter 24B based on the position information of a sound source obtained by the position information obtainer 29.

For example, when the position of the sound source 65 is in the area 110B of the stage 60, the matrix mixer 23M increases the level of the sound signal output to the FIR filters CA to CJ. When the position of the sound source 65 moves into the area 110A of the stage 60, the matrix mixer 23M increases the level of the sound signal output to the FIR filters LA to LJ. In this way, the matrix mixer 23M can change the filter coefficient of the FIR filter by adjusting the level of the sound signal output from each microphone to each system according to the position of a sound source.

When the sound source 65 moves across the areas 110A, 110B, and 110C shown in FIG. 7, the matrix mixer 23M preferably crossfades the sound signals to change the FIR filter. For example, when the sound source 65 moves from the area 110A to the area 110B, the matrix mixer 23M gradually lowers the level of the sound signal output from the directional microphone 11A to the FIR filters LA to LJ, and gradually increases the level of the sound signal output from the directional microphone 11B to the FIR filters CA to CJ. In this case, the matrix mixer 23M corresponds to a crossfade processor.

That is, when switching from the first impulse response to the second impulse response, the sound signal processor 10 crossfades the sound signal with which to convolve the first impulse response and the sound signal with which to convolve the second impulse response.

In this manner, the sound signal processor 10 can produce a smoother and more natural feeling of movement of the sound source.

The omnidirectional microphone 12A, the omnidirectional microphone 12B, and the omnidirectional microphone 12C collect the entire sound in the room 62, including the direct sound of the sound source 65 and the reflection sound in the room 62. Therefore, if the sound signal processor 10 generates a reverberant sound control signal using sound signals obtained by the omnidirectional microphone 12A, the omnidirectional microphone 12B, and the omnidirectional microphone 12C, the same reverberant is reproduced in the sound of the stage and in the sound of the audience seat. Therefore, for example, the same reverberant is reproduced in the sound of the performer and in the sound of the applause of the audience, and the performer and the audience can obtain a sense of unity.

Further, the early reflection sound has a smaller number of reflections than the reverberant sound that undergoes multiple reflections in the space. For this reason, the energy of the early reflection sound is higher than the energy of the reverberant sound. Therefore, by increasing the level of each speaker that outputs the early reflection sound control signal, the effect of the subjective impression of the early reflection sound can be improved, and the controllability of the early reflection sound can be improved.

Further, by reducing the number of speakers that output the early reflection sound control signal, it is possible to suppress an excessive increase in diffused sound energy. That is, the extension of the reverberant in the room due to the early reflection sound control signal can be suppressed, and the controllability of the early reflection sound can be improved.

As the speaker that outputs the early reflection sound control signal is installed on the side of the room, which is located close to the audience, the speaker can be easily controlled to deliver an early reflection sound to the audience, and the controllability of the early reflection sound can be improved. Further, by installing the speaker that outputs the reverberant sound control signal on the ceiling of the room, it is possible to suppress the difference in the reverberant sounds due to the positions of the audience.

The description of the present embodiment is exemplary in all respects and is not restrictive. The scope of the present disclosure is shown not by the above-described embodiment but by the scope of claims. Furthermore, the scope of the present disclosure is intended to include all modifications within the meaning and scope equivalent to those of the claims.

What is claimed is:

1. A sound signal processing method comprising:
   obtaining a sound signal of a sound source;
   obtaining a location of the sound source in a predetermined space having a plurality of areas that are disposed outside each other;
   determining, based on the location of the sound source in the predetermined space, an area among the plurality of areas of the predetermined space that the sound source is located in;
   convolving, according to the area among the plurality of areas of the predetermined space that the sound source is located in, an impulse response of an early reflection sound with the sound signal to generate an early reflection sound control signal that reproduces an early reflection sound; and
   convolving an impulse response of a reverberant sound with the sound signal to generate a reverberant sound control signal that reproduces a reverberant sound.

2. The sound signal processing method according to claim 1, wherein
   the reverberant sound control signal is generated by convolving, according to the area among the plurality of areas of the predetermined space that the sound source is located in, the impulse response of the reverberant sound with the sound signal.

3. The sound signal processing method according to claim 1, wherein
   the impulse response of the early reflection sound and the impulse response of the reverberant sound are each an impulse response measured for each of the plurality of areas of the predetermined space in advance.

4. The sound signal processing method according to claim 3, further comprising
   measuring the impulse response of the early reflection sound and the impulse response of the reverberant sound for each of a plurality of speakers that output the early reflection sound control signal and the reverberant sound control signal and for each of the plurality of areas of the predetermined space in advance.

5. The sound signal processing method according to claim 1, wherein
   the impulse response of the early reflection sound and the impulse response of the reverberant sound each include a first impulse response and a second impulse response, and
   the sound signal with which to convolve the first impulse response and a sound signal with which to convolve the second impulse response are crossfaded when switching is made from the first impulse response to the second impulse response.

6. The sound signal processing method according to claim 1, wherein
   convolving, according to the area among the plurality of areas of the predetermined space that the sound source is located in, the impulse response of the early reflection sound with the sound signal to generate the early reflection sound control signal includes (i) using a first filter to generate the early reflection sound control signal in a case where the sound source is located in a first area among the plurality of areas of the predetermined space and (ii) using a second filter, different from the first filter, to generate the early reflection sound control signal in a case where the sound source is located in a second area among the plurality of areas of the predetermined space different from the first area.

7. The sound signal processing method according to claim 1, wherein the sound signal to be convolved with the impulse response of the reverberant sound is obtained from an omnidirectional microphone.

8. A sound signal processing device comprising:
a sound signal obtainer that obtains a sound signal of a sound source;
a sound source locator that obtains a location of the sound source in a predetermined space having a plurality of areas that are disposed outside each other and that determines, based on the location of the sound source in the predetermined space, an area among the plurality of areas of the predetermined space that the sound source is located in;
an early reflection sound control signal generator that convolves, according to the area among the plurality of areas of the predetermined space that the sound source is located in, an impulse response of an early reflection sound with the sound signal to generate an early reflection sound control signal that reproduces an early reflection sound; and
a reverberant sound control signal generator that convolves an impulse response of a reverberant sound with the sound signal to generate a reverberant sound control signal that reproduces a reverberant sound.

9. The sound signal processing device according to claim 8, wherein
the reverberant sound control signal generator generates the reverberant sound control signal by convolving, according to the area among the plurality of areas of the predetermined space that the sound source is located in, the impulse response of the reverberant sound with the sound signal.

10. The sound signal processing device according to claim 8, wherein
the impulse response of the early reflection sound and the impulse response of the reverberant sound are each an impulse response measured for each of the plurality of areas of the predetermined space in advance.

11. The sound signal processing device according to claim 10, wherein
the impulse response of the early reflection sound and the impulse response of the reverberant sound are measured for each of a plurality of speakers that output the early reflection sound control signal and the reverberant sound control signal and for each of the plurality of areas of the predetermined space in advance.

12. The sound signal processing device according to claim 8, wherein
the impulse response of the early reflection sound and the impulse response of the reverberant sound each include a first impulse response and a second impulse response, the sound signal processing device further comprising
a crossfade processor that crossfades a sound signal with which to convolve the first impulse response and a sound signal with which to convolve the second impulse response when switching is made from the first impulse response to the second impulse response.

13. The sound signal processing device according to claim 8, wherein
convolving, according to the area among the plurality of areas of the predetermined space that the sound source is located in, the impulse response of the early reflection sound with the sound signal to generate the early reflection sound control signal includes (i) using a first filter to generate the early reflection sound control signal in a case where the sound source is located in a first area among the plurality of areas of the predetermined space and (ii) using a filter, different from the first filter, to generate the early reflection sound control signal in a case where the sound source is located in a second area among the plurality of areas of the predetermined space different from the first area.

14. The sound signal processing device according to claim 8, wherein
the sound signal to be convolved with the impulse response of the reverberant sound is obtained from an omnidirectional microphone.

15. A non-transitory computer-readable storage medium storing a sound signal processing program that causes a sound signal processing device to execute processing of:
obtaining a sound signal of a sound source;
obtaining a location of the sound source in a predetermined space having a plurality of areas that are disposed outside each other;
determining, based on the location of the sound source in the predetermined space, an area among the plurality of areas of the predetermined space that the sound source is located in;
convolving, according to the area among the plurality of areas of the predetermined space that the sound source is located in, an impulse response of an early reflection sound with the sound signal to generate an early reflection sound control signal that reproduces an early reflection sound; and
convolving an impulse response of a reverberant sound with the sound signal to generate a reverberant sound control signal that reproduces a reverberant sound.

* * * * *